(12) United States Patent
Bang et al.

(10) Patent No.: US 11,219,887 B2
(45) Date of Patent: Jan. 11, 2022

(54) METHOD FOR PREPARING ORGANIC ZINC CATALYST, ORGANIC ZINC CATALYST PREPARED BY THE METHOD AND METHOD FOR PREPARING POLYALKYLENE CARBONATE RESIN USING THE CATALYST

(71) Applicant: LG CHEM, LTD., Seoul (KR)

(72) Inventors: Jungup Bang, Daejeon (KR); Kyosung Park, Daejeon (KR); Seung Young Park, Daejeon (KR); Gyo Hyun Hwang, Daejeon (KR); Byung Hee Choi, Daejeon (KR); Sung-Kyoung Kim, Daejeon (KR); Yongju Bang, Daejeon (KR)

(73) Assignee: LG Chem, Ltd., Seoul (KR)

( * ) Notice: Subject to any disclaimer, the term of this patent is extended or adjusted under 35 U.S.C. 154(b) by 277 days.

(21) Appl. No.: 16/469,421

(22) PCT Filed: Aug. 28, 2018

(86) PCT No.: PCT/KR2018/009925
§ 371 (c)(1),
(2) Date: Jun. 13, 2019

(87) PCT Pub. No.: WO2019/045418
PCT Pub. Date: Mar. 7, 2019

(65) Prior Publication Data
US 2019/0329230 A1 Oct. 31, 2019

(30) Foreign Application Priority Data

Aug. 28, 2017 (KR) .................. 10-2017-0108897
Aug. 28, 2018 (KR) .................. 10-2018-0101027

(51) Int. Cl.
*B01J 31/04* (2006.01)
*B01J 31/16* (2006.01)
(Continued)

(52) U.S. Cl.
CPC .......... *B01J 31/04* (2013.01); *B01J 31/1691* (2013.01); *B01J 37/04* (2013.01); *C08G 64/34* (2013.01);
(Continued)

(58) Field of Classification Search
None
See application file for complete search history.

(56) References Cited

U.S. PATENT DOCUMENTS 6,617,467 B1 9/2003 Muller et al.
2012/0123066 A1 5/2012 Fujimoto et al.
(Continued)

FOREIGN PATENT DOCUMENTS

CN 101747618 A 6/2010
CN 102250308 A 11/2011
(Continued)

OTHER PUBLICATIONS

Cramer et al. (J. Phy. Chem. C, 120, 24697-24705). (Year: 2016).*
(Continued)

*Primary Examiner* — Yun Qian
(74) *Attorney, Agent, or Firm* — Dentons US LLP

(57) ABSTRACT

The disclosed relates to a method for preparing an organic zinc catalyst used in the synthesis of a polyalkylene carbonate resin, an organic zinc catalyst provided therefrom, and a method for preparing a polyalkylene carbonate resin using the catalyst. The organic zinc catalyst according to the present disclosure includes a predetermined amount of Zr on the surface through a simple process, and thus can exhibit improved catalytic activity as compared to a conventional
(Continued)

catalyst in the polymerization process for preparing a polyalkylene carbonate resin.

5 Claims, 1 Drawing Sheet

(51) Int. Cl.
*B01J 37/04* (2006.01)
*C08G 64/34* (2006.01)

(52) U.S. Cl.
CPC ........ *B01J 2531/26* (2013.01); *B01J 2531/48* (2013.01)

(56) References Cited

U.S. PATENT DOCUMENTS

| | | |
|---|---|---|
| 2014/0200328 A1 | 7/2014 | Brym et al. |
| 2016/0194442 A1 | 7/2016 | Kim et al. |
| 2017/0029563 A1 | 2/2017 | Kang et al. |

FOREIGN PATENT DOCUMENTS

| | | |
|---|---|---|
| CN | 103897166 A | 7/2014 |
| CN | 105745017 A | 7/2016 |
| CN | 105899290 A | 8/2016 |
| EP | 2 711 385 A1 | 3/2014 |
| EP | 3127607 A1 | 2/2017 |
| GB | 914886 A | 1/1963 |
| JP | 2006-503946 A | 2/2006 |
| JP | 2013-163771 A | 8/2013 |
| JP | 6774180 B1 | 9/2015 |
| JP | 2016067999 A | 5/2016 |
| JP | 2016530301 A | 9/2016 |
| KR | 10-2005-0098818 A | 7/2006 |
| KR | 10-2012-0023820 A | 3/2012 |
| KR | 10-2014-0062130 A | 5/2014 |
| KR | 10-2015-0085676 A | 7/2015 |
| KR | 10-2015-0143342 A | 12/2015 |
| KR | 10-2016-0109052 A | 9/2016 |
| KR | 10-1755523 B1 | 7/2017 |
| WO | 2013101751 A1 | 7/2013 |

OTHER PUBLICATIONS

Gao, et al. 2015. Silica-supported zinc glutarate catalyst synthesized by rheological phase reaction used in the copolymerization of carbon dioxide and propylene oxide.J Polym Res. 22:220.

Vermoortele, et al. 2013. Synthesis Modulation as a Tool To Increase the Catalytic Activity of Metal-Organic Frameworks: The Unique Case of UiO-66(Zr). Journal of the American Chemical Society.

Kim, et al. 2005. Synthesis of Zinc Glutarates with Various Morphologies Using an Amphiphilic Template and Their Catalytic Activities in the Copolymerization of Carbon Dioxide and Propylene Oxide. Journal of Polymer Science. vol. 43. pp. 4079-4088.

L. Oar-Arteta et al., "Metal organic frameworks as precursors for the manufacture of advanced catalytic materials", Materials Chemistry Frontiers, 2017, 1 1709-1745.

Meng, Y.Z. et al., "Effects of the structure and morphology of zinc glutarate on the fixation of carbon dioxide into polymer", Journal of Polymer Science Part A Polymer Chemistry, vol. 40, No. 21, pp. 3579-3591 (2002).

Lu Chengming, "Study on Catalysis and Synthesis Technology of Multifunctional Polycarbonate Material", (Tianjin University), Chinese Doctoral Dissertations & Master's Theses Full-text Database, Engineering Science and Technology I, No. 4 (2009), pp. 23, 28, 32 and 39.

\* cited by examiner

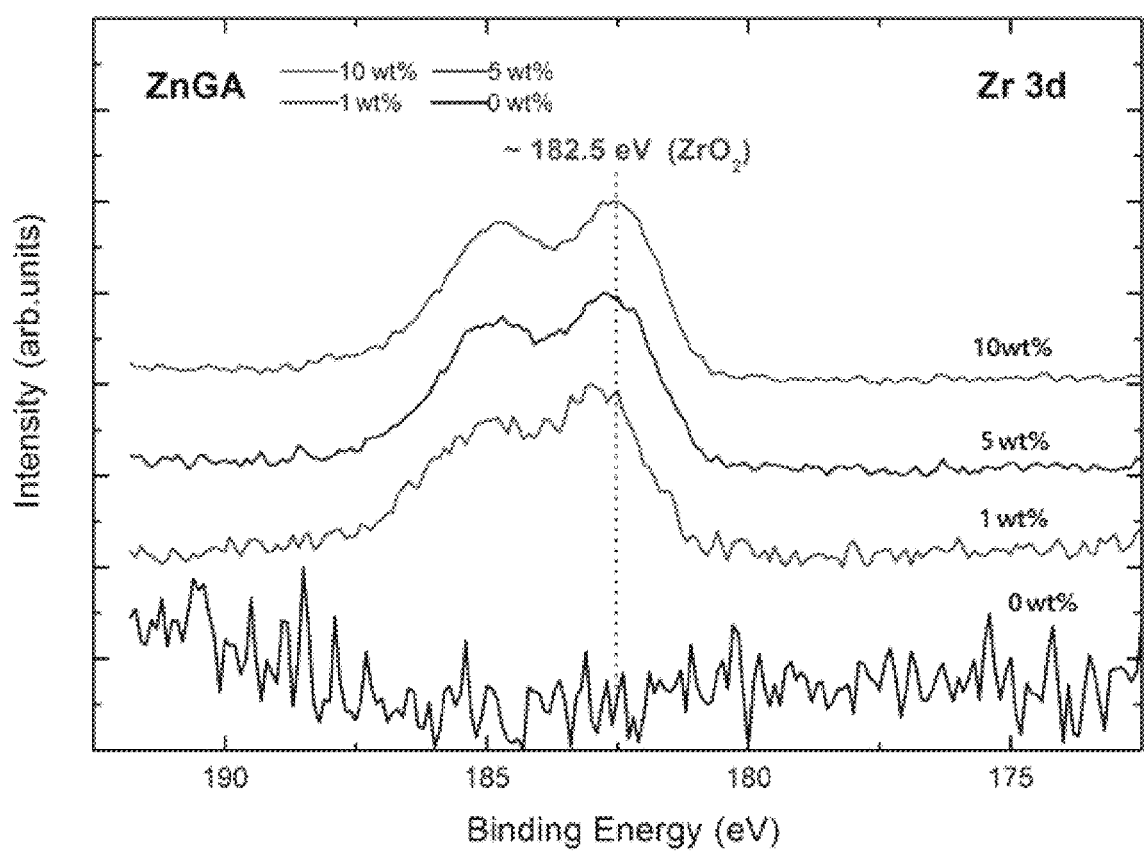

METHOD FOR PREPARING ORGANIC ZINC CATALYST, ORGANIC ZINC CATALYST PREPARED BY THE METHOD AND METHOD FOR PREPARING POLYALKYLENE CARBONATE RESIN USING THE CATALYST

CROSS-REFERENCE TO RELATED APPLICATION(S)

This application is a National Stage Application of International Application No. PCT/KR2018/009925, filed on Aug. 28, 2018, which claims priority to and the benefits of Korean Patent Application No. 10-2017-0108897 filed with Korean Intellectual Property Office on Aug. 28, 2017 and Korean Patent Application No. 10-2018-0101027 filed with Korean Intellectual Property Office on Aug. 28, 2018, the entire contents of which are incorporated herein by reference in its entirety.

TECHNICAL FIELD

The present invention relates to a method for preparing an organic zinc catalyst, which can exhibit improved activity in the polymerization process for preparing a polyalkylene carbonate resin, an organic zinc catalyst prepared by the method, and a method for preparing a polyalkylene carbonate resin using the catalyst.

BACKGROUND ART

A polyalkylene carbonate is a non-crystalline transparent resin, and has only an aliphatic structure, unlike an aromatic carbonate that is a similar type to an engineering plastic, and is synthesized by a copolymerization reaction of carbon dioxide and an epoxide as a monomer under a catalyst. Such a polyalkylene carbonate has the advantages in having excellent transparency, elongation, and oxygen barrier properties, and exhibiting biodegradability and being completely decomposed into carbon dioxide and water without leaving a carbon residue during combustion.

Thus, various catalysts for the production of polyalkylene carbonate resins have been studied and proposed, and as a typical catalyst, a zinc dicarboxylate-based catalyst, such as a glutarate catalyst in which zinc and a dicarboxylic acid are bonded, has been known.

Such a zinc dicarboxylate-based catalyst, typically a zinc glutarate catalyst, is formed by reacting a zinc precursor with a dicarboxylic acid such as glutaric acid, and takes the form of fine crystalline particles. However, it has been difficult to control the zinc dicarboxylate-based catalyst in the form of crystalline particles so as to have a uniform and fine particle size in the course of its preparation. Conventional zinc dicarboxylate-based catalysts have a particle size of a nanometer scale, but due to the agglomeration of the catalyst particles in the medium, agglomerates of which a particle size is increased and of which a surface area is reduced are formed. Thus, there is a problem that the catalytic activity is decreased in the production of the polyalkylene carbonate resin using the catalyst.

In addition, the conventional zinc dicarboxylate-based catalyst causes depolymerization of the polymerized polyalkylene carbonate resin by a backbiting reaction, and thus it is necessary for the catalyst to be removed from the resin after completion of the polymerization. For this purpose, a method of adding a flocculant and then physically removing the catalyst using a filter, or a method of chemically removing the catalyst using an ion exchange resin, may be used. However, the removal of the zinc dicarboxylate-based catalyst using these methods requires an additional process including adding an additional solvent to lower viscosity, and then removing the catalyst, followed by removing the solvent, so that a large amount of energy may be consumed, and the catalyst used in polymerization may be difficult to reuse.

Further, in the case of a zinc glutarate catalyst, its activity is greatly affected by acid-base properties and the distance between Zn—Zn. Therefore, it is important to increase the activity by controlling the distance between Zn—Zn in the catalyst.

However, at the time of producing a polyalkylene carbonate resin, the development of an organic zinc catalyst having improved process conditions while having excellent catalytic activity is still insufficient.

DETAILED DESCRIPTION OF THE INVENTION

Technical Problem

An object of the present invention is intended to provide a method for preparing an organic zinc catalyst, which exhibits excellent catalytic activity compared to a conventional catalyst in the polymerization for preparing a polyalkylene carbonate resin.

Another object of the present invention is intended to provide an organic zinc catalyst prepared by the aforementioned method.

Still another object of the present invention is intended to provide a method for preparing a polyalkylene carbonate resin using the aforementioned organic zinc catalyst.

Technical Solution

According to one embodiment of the present invention, a method for preparing an organic zinc catalyst is provided, including:

reacting a zinc precursor with a dicarboxylic acid having 3 to 20 carbon atoms and a zirconium-based co-catalyst, wherein the zirconium-based co-catalyst is any one selected from the group consisting of a Zr-metal organic framework (MOF) containing zirconium and a Zr precursor.

According to another embodiment of the present invention, an organic zinc catalyst is provided, including:

a zinc dicarboxylate-based compound; and a zirconium element supported or substituted on the surface of the zinc dicarboxylate-based compound, wherein the zinc element is obtained from any one of a zirconium-based co-catalyst selected from the group consisting of a Zr-metal organic framework (MOF) containing zirconium and a Zr precursor.

According to a further embodiment of the present invention, a method for preparing a polyalkylene carbonate resin is provided, including polymerizing a monomer containing an epoxide and carbon dioxide in the presence of the organic zinc catalyst.

Hereinafter, the organic zinc catalyst, the method for preparing the same, and the method for preparing a polyalkylene carbonate resin using the catalyst according to embodiments of the invention will be described in more detail.

Unless otherwise specified throughout this specification, the technical terms used herein are only for describing specific embodiments and are not intended to limit the present invention.

The singular forms "a" and "an" are intended to include the plural forms as well, unless the context clearly indicates otherwise.

The term "including" or "comprising" used herein specifies a specific feature, region, integer, step, action, element, and/or component, but does not exclude the addition of a different specific feature, area, integer, step, action, element, component, and/or group.

As used herein, the term "organic zinc catalyst" may refer to a catalyst which is formed on the surface of a zinc dicarboxylate-based catalyst (hereinafter referred to as ZnGA) having activity in the preparation of a polyalkylene carbonate resin, where a Zr-element component is present by being fixed by a chemical bond such as a covalent bond or a coordination bond, or by a physical force such as adhesion, attachment, adsorption, or at least partially being buried.

I. Preparation of Organic Zinc Catalyst

According to one embodiment of the present invention, a method for preparing an organic zinc catalyst may be provided, including reacting a zinc precursor with a dicarboxylic acid having 3 to 20 carbon atoms and a zirconium-based co-catalyst, wherein the zirconium-based co-catalyst is any one selected from the group consisting of a Zr-metal organic framework (MOF) containing zirconium and a Zr precursor.

Such a catalyst may be used in the synthesis of a polyalkylene carbonate resin to exhibit high activity, thereby improving a synthesis yield of the polyalkylene carbonate.

Specifically, the present invention has a feature in that a small amount of the zirconium element is present by being bonded to the surface of the organic zinc catalyst used in the synthesis of a polyalkylene carbonate resin by particularly using a zirconium-based material as a co-catalyst.

In addition, in the method of the present invention, an increase in catalytic activity may be expected as compared to a method of using a common transition metal, such as zinc, cobalt, or the like, or a simple surface coating method.

Moreover, the method of the present invention may exhibit an effect of enhancing the activity of the catalyst as compared with a catalyst prepared by using zinc alone, or a method of using a transition metal such as cobalt in addition to zirconium, or a method of coating a catalyst surface simply using a transition metal.

Preferably, in the present invention, an organic zinc catalyst exhibiting high activity may be simply prepared through a simple process of mixing a specific zirconium-based co-catalyst containing a small amount of a Zr component with a zinc precursor and a dicarboxylic acid. Therefore, in the present invention, by using the catalyst at the time of preparing the polyalkylene carbonate resin, which is a heterogeneous catalyst surface reaction, the reactivity can be improved, thus improving productivity of the polyalkylene carbonate.

At this time, the zirconium-based co-catalyst is used as a reaction precursor, and the zirconium-based co-catalyst is not included in the final organic zinc catalyst structure. However, in the final organic zinc catalyst, only a small amount of the zirconium-element component contained in the added zirconium co-catalyst is present by being bonded to the surface of the zinc dicarboxylate-based catalyst in a predetermined amount. Zr, which is partially included in the ZnGA surface in a specific amount, may act as a co-catalyst and thus increase activity in the synthesis reaction of the polyalkylene carbonate resin.

As the zirconium-based co-catalyst, a substance including zirconium as a source may be used. Specifically, the zirconium-based co-catalyst may be any one selected from the group consisting of a Zr-metal organic framework (Zr-MOF) containing zirconium and a Zr precursor. Further, the co-catalyst can be used without limitation as long as it is Zr-metal-containing organic framework containing zirconium or a Zr precursor.

For example, the Zr-metal organic framework may be UiO-66 (zirconium 1,4-dicarboxybenzene MOF), UiO-66-$NH_2$, UiO-66-$NH^{3+}$, UiO-67, UiO-68, and Nu-1000. The Zr precursor may be at least one selected from the group consisting of $ZrSO_4$, zirconium acetate, zirconium iodide, zirconium fluoride, zirconium chloride, zirconium acetylacetonate, zirconium butoxide, zirconium propoxide, and $ZrO_2$.

In the organic zinc catalyst, the zirconium-based co-catalyst may be used in an amount of 0.1 to 100 parts by weight or 0.2 to 60 parts by weight based on 100 parts by weight of the zinc precursor. When the content of the zirconium-based co-catalyst is calculated as a molar ratio, it may be used at a molar amount of 0.1 mmol to 0.5 mol based on 1 mol of the zinc precursor.

Specifically, when the content of the zirconium-based co-catalyst is less than 0.1 parts by weight (0.1 mmol), there is a problem that Zr is not added on the surface of ZnGA. In contrast, when the content of the zirconium-based co-catalyst is more than 100 parts by weight (0.5 mol), the efficiency may be reduced due to excessive co-catalyst use.

Such a method of the present invention may be carried out by preparing a mixture of a dicarboxylic acid and a zirconium-based co-catalyst, and adding a zinc precursor thereto.

The mixture of a dicarboxylic acid and a zirconium-based co-catalyst may be provided by a dispersing method. According to a preferred embodiment, the mixture may be provided by dispersing a dicarboxylic acid and a zirconium-based co-catalyst in a solvent under reflux followed by heating. The heating may be carried out at a temperature of 25 to 100° C. for 1 to 24 hours.

Subsequently, a zinc precursor material may be added to the mixture, thereby preparing an organic zinc catalyst through the reaction of the zinc precursor with the dicarboxylic acid.

Therefore, in the above step, a zinc dicarboxylate-based compound may be formed by the reaction of the zinc precursor with the dicarboxylic acid, and at the same time, the specific zirconium-based co-catalyst described above may be added, so that the Zr component is fixed to the surface of the zinc dicarboxylate-based compound, and thus the zirconium element may be supported or substituted on the surface thereof.

At this time, the reaction of the zinc precursor with the dicarboxylic acid may be carried out in the presence of a solvent capable of uniformly dispersing or dissolving the dicarboxylic acid. For example, the reaction may be carried out by adding a solvent, a dicarboxylic acid, and the zirconium-based co-catalyst into a reactor capable of stirring, adding a zinc precursor thereto, and stirring the mixture. Alternatively, the reaction may be carried out by adding the zirconium co-catalyst and the zinc precursor into a bed-type reactor, and then circulating the solvent and the dicarboxylic acid.

In the reaction step, as the zinc precursor, at least one compound selected from the group consisting of zinc oxide (ZnO), zinc sulfate ($ZnSO_4$), zinc chlorate ($Zn(ClO_3)_2$), zinc nitrate ($Zn(NO_3)_2$), zinc acetate ($Zn(OAc)_2$), and zinc hydroxide ($Zn(OH)_2$) may be used.

In addition, as the dicarboxylic acid having 3 to 20 carbon atoms, at least one compound selected from the group consisting of a malonic acid, a glutaric acid, a succinic acid, an adipic acid, a terephthalic acid, an isophthalic acid, a homophthalic acid, and a phenylglutaric acid may be used. Preferably, when using glutaric acid as the dicarboxylic acid, it is possible to exhibit excellent catalytic performance.

The dicarboxylic acid may be used in an equivalent or excess molar amount with respect to the zinc precursor. Specifically, the reaction step may be carried out by adding at a molar ratio of 1 mol of the zinc precursor to 1 to 1.5 mol of the dicarboxylic acid, or at a molar ratio of about 1.1 to 1.3 mol. When the reaction is carried out while maintaining the dicarboxylic acid in an equivalent or excess molar amount to the zinc precursor, the reaction may gradually progress in a form in which the dicarboxylic acid molecules or ions surround the uniformly dispersed zinc precursor.

In the reaction step, as the solvent, any organic or aqueous solvent known to be capable of uniformly dispersing or dissolving the dicarboxylic acid may be used. Specific examples of such a solvent may include at least one solvent selected from the group consisting of toluene, hexane, dimethylformamide, acetone, methanol, ethanol, and water. The solvent may be added in an appropriate amount so that raw material components can be sufficiently submerged therein, and may be preferably added at a molar amount of 2 to 1000 mol based on 1 mol of the dicarboxylic acid. More preferably, the solvent may be added at a molar amount of 5 to 100 mol, or 10 to 50 mol, based on 1 mol of the dicarboxylic acid. Within the above range, the dicarboxylic acid may be appropriately dispersed in the solvent, and the progress of the catalyst synthesis reaction may be effectively carried out.

In addition, the reaction of the zinc precursor with the dicarboxylic acid may be carried out at a temperature of about 40 to 130° C. for about 1 to 48 hours. According to one embodiment of the present invention, the reaction may be carried out in the presence of the solvent at a temperature of about 40 to 80° C. for about 1 to 24 hours, and then the reaction may be further carried out at a temperature of about 80 to 130° C. for about 1 to 24 hours. By controlling the reaction temperature or time, a catalyst in which the Zr components are uniformly fixed onto the surface of the zinc dicarboxylate-based compound having a uniform shape may be prepared.

Further, in the method of preparing an organic zinc catalyst according to the above embodiment, a step of washing the organic zinc catalyst and then drying it may be further carried out.

The washing step may be repeated several times using the solvent that can be used in the above reaction until no unreacted reactant remains. Further, the drying step may be carried out by vacuum drying at a temperature of 40 to 200° C.

II. Organic Zinc Catalyst

According to one embodiment of the present invention, an organic zinc catalyst may be provided, including: a zinc dicarboxylate-based compound; and a zirconium element supported or substituted on the surface of the zinc dicarboxylate-based compound, wherein the zinc element is obtained from any one of a zirconium-based co-catalyst selected from the group consisting of a Zr-metal organic framework (MOF) containing zirconium and a Zr precursor.

Preferably, the organic zinc catalyst according to the present invention may be substituted with Zr instead of Zn, or may be present in the form of $ZrO_2$, so that it may be present by being supported or substituted as a specific amount of zirconium may be bonded to the surface of the zinc dicarboxylate-based compound.

For example, the content of the zirconium element on the surface of the zinc dicarboxylate-based compound may be 0.01 to 5% by weight based on the total weight of the elements constituting the organic zinc catalyst. More preferably, the content of the zirconium element on the surface of the zinc dicarboxylate-based compound may be 0.01 to 1% by weight based on the total weight of the elements constituting the organic zinc catalyst. At this time, when the content of the zirconium element is 0.01% by weight or less, there is a problem that no effect of enhancing activity may be obtained, and when it is more than 5% by weight, the activity may be decreased.

In addition, the Zr-metal organic framework containing zirconium may be at least one selected from the group consisting of UiO-66 (zirconium 1,4-dicarboxybenzene MOF), UiO-66-$NH_2$, UiO-66-$NH^{3+}$, UiO-67, UiO-68, and Nu-1000. The Zr precursor may be at least one selected from the group consisting of $ZrSO_4$, zirconium acetate, zirconium iodide, zirconium fluoride, zirconium chloride, zirconium acetylacetonate, zirconium butoxide, zirconium propoxide, and $ZrO_2$.

The organic zinc catalyst prepared in the present invention may exhibit high activity at the time of preparing a polyalkylene carbonate resin, as a small amount of Zr is included on the surface of the ZnGA catalyst.

Meanwhile, the zinc dicarboxylate-based compound for supporting the zirconium element on the surface thereof by adding the zirconium-based co-catalyst is a reaction product of the zinc precursor with the dicarboxylic acid having 3 to 20 carbon atoms as described above.

Specifically, the zinc dicarboxylate-based compound may be at least one compound selected from the group consisting of zinc malonate, zinc glutarate, zinc succinate, zinc adipate, zinc terephthalate, zinc isophthalate, zinc homophthalate, and zinc phenylglutarate. Preferably, zinc glutarate may be advantageous as the zinc dicarboxylate-based compound in terms of the activity of the organic zinc catalyst.

III. Method for Preparing Polyalkylene Carbonate Resin Using the Catalyst

Meanwhile, according to another embodiment of the present invention, a method for preparing a polyalkylene carbonate resin may be provided, including polymerizing a monomer containing an epoxide and carbon dioxide in the presence of the organic zinc catalyst.

In the method for preparing a resin, the organic zinc catalyst may be used as a heterogeneous catalyst, and the polymerization step may be carried out by solution polymerization in an organic solution. That is, the polymerization step may be carried out by solution polymerization in which a reaction mixture including an epoxide, carbon dioxide, and a solvent can be in continuous contact with the organic zinc catalyst. As a result, the heat of reaction may be appropriately controlled, and the molecular weight or viscosity of the polyalkylene carbonate resin to be obtained may be easily controlled.

In the solution polymerization, as a solvent, at least one selected from the group consisting of dichloromethane, ethylene dichloride, trichloroethane, tetrachloroethane, chloroform, acetonitrile, propionitrile, dimethylformamide, N-methyl-2-pyrrolidone, dimethyl sulfoxide, nitromethane, 1,4-dioxane, hexane, toluene, tetrahydrofuran, methyl ethyl ketone, methylamine ketone, methyl isobutyl ketone, acetone, cyclohexanone, trichloroethylene, methyl acetate, vinyl acetate, ethyl acetate, propyl acetate butyrolactone, caprolactone, nitropropane, benzene, styrene, xylene, and methyl propasol may be used. Among them, by using a chlorinated solvent such as dichloromethane, ethylene dichloride, trichloroethane, tetrachloroethane, or chloroform, the polymerization reaction may be more effectively carried out.

The solvent may be used at a weight of about 0.1 to 100 times based on the weight of the epoxide, and may be appropriately used at a weight of about 0.5 to 50 times. At this time, when the solvent is used at a weight of less than 0.1 times, the solvent may not properly act as a reaction medium, so that it may be difficult to obtain the above-described advantages of the solution polymerization. Further, when the solvent is used at a weight exceeding 100 times, the concentration of the epoxide may be relatively decreased, so that productivity may be deteriorated, and the molecular weight of the finally formed resin may be decreased, or a side reaction may be increased.

In addition, the carbon dioxide may be added at a molar amount of about 1 to 10 mol, based on 1 mol of the epoxide in the reaction mixture. More preferably, the carbon dioxide may be added at a molar amount of about 2 to 5 mol based on 1 mol of the epoxide. When the carbon dioxide is used at a molar amount of less than 1 mol, the amount of polyalkylene glycol in the by-product tends to increase, and when the carbon dioxide is used at a molar amount exceeding 10 mol, the reaction may not be effective due to the addition of monomers in excess.

Further, the organic zinc catalyst may be added at a molar ratio of about 1:50 to 1:1000 relative to the epoxide. More preferably, the organic zinc catalyst may be added at a molar ratio of about 1:70 to 1:600, or about 1:80 to 1:300, relative to the epoxide. When the molar ratio is excessively small, it may be difficult to exhibit sufficient catalytic activity at the time of the solution polymerization. In contrast, when the molar ratio is excessively large, the reaction may not be effective due to the excessive amount of the catalyst used, by-products may be formed, or back-biting of the resin caused by heating in the presence of the catalyst may occur.

Meanwhile, as the epoxide, at least one selected from the group consisting of an alkylene oxide having 2 to 20 carbon atoms substituted or unsubstituted with a halogen or an alkyl group having 1 to 5 carbon atoms, a cycloalkylene oxide having 4 to 20 carbon atoms substituted or unsubstituted with a halogen or an alkyl group having 1 to 5 carbon atoms, and a styrene oxide having 8 to 20 carbon atoms substituted or unsubstituted with a halogen or an alkyl group having 1 to 5 carbon atoms, may be used. Typically, as the epoxide, an alkylene oxide having 2 to 20 carbon atoms substituted or unsubstituted with a halogen or an alkyl group having 1 to 5 carbon atoms may be used.

Specific examples of the epoxide may include ethylene oxide, propylene oxide, butene oxide, pentene oxide, hexene oxide, octene oxide, decene oxide, dodecene oxide, tetradecene oxide, hexadecene oxide, octadecene oxide, butadiene monoxide, 1,2-epoxy-7-oxtene, epifluorohydrin, epichlorohydrin, epibromohydrin, isopropyl glycidyl ether, butyl glycidyl ether, t-butyl glycidyl ether, 2-ethylhexyl glycidyl ether, allyl glycidyl ether, cyclopentene oxide, cyclohexene oxide, cyclooctene oxide, cyclododecene oxide, alpha-pinene oxide, 2,3-epoxynorbornene, limonene oxide, dieldrin, 2,3-epoxypropylbenzene, styrene oxide, phenyl propylene oxide, stilbene oxide, chlorostilbene oxide, dichlorostilbene oxide, 1,2-epoxy-3-penoxypropane, benzyloxymethyl oxirane, glycidyl-methylphenyl ether, chlorophenyl-2,3-epoxypropyl ether, epoxypropyl methoxyphenyl ether, biphenyl glycidyl ether, glycidyl naphthyl ether, or the like. Most representatively, ethylene oxide may be used as the epoxide.

In addition, the solution polymerization may be carried out at a temperature of 50 to 90° C. under a pressure of 15 to 50 bar for 1 hour to 60 hours. Further, it is more preferable to carry out the solution polymerization at a temperature of 70 to 90° C. under a pressure of 20 to 40 bar for 3 to 40 hours.

Under the above conditions, the polymerization reaction promoted by the organic zinc catalyst according to one embodiment may be effectively carried out. Further, the method for preparing a polyalkylene carbonate resin of one embodiment may further include the steps of sufficiently washing an organic zinc catalyst or a reactor containing the catalyst with a solvent after the polymerization, and then storing the same in the solvent so as to not be dried. Accordingly, the stored organic zinc catalyst may be reused in subsequent polymerization, and specifically, the stored organic zinc catalyst may be repeatedly used three or more times.

The remaining polymerization processes and conditions except for the above may depend on conventional polymerization conditions or the like for preparing a polyalkylene carbonate resin, and thus an additional description thereof will be omitted.

Advantageous Effects

The organic zinc catalyst according to the present invention can be easily prepared through a simple process of adding a Zr co-catalyst during the catalyst synthesis, and the organic zinc catalyst thus prepared can increase catalytic activity during the synthesis of a polyalkylene carbonate resin as compared to a conventional catalyst. In particular, according to the present invention, it has been found that the catalytic activity was greatly improved even when a small amount of Zr component was included on the surface of the ZnGA catalyst.

BRIEF DESCRIPTION OF DRAWING

The drawing shows the results of a Zr 3 d narrow scan spectrum (XPS) according to the change in the amount of zirconium co-catalyst added to ZnGA.

DETAILED DESCRIPTION OF THE EMBODIMENTS

Hereinafter, preferred embodiments are provided to help understanding of the present invention. However, these examples are given for illustrative purposes only, and the scope of the invention is not intended to be limited to or by these examples.

Example 1

In a 100 ml round-bottom flask, 2.64 g (20 mmol) of glutaric acid and 0.18 g of UiO-66 were added to 50 ml of toluene and dispersed under reflux, and then the mixture was heated at 55° C. for 30 minutes. 1.36 g of ZnO particles were added to the mixed solution and then stirred for 3 hours.

The formed solids were separated using a centrifuge. The separated solids were washed three times with acetone/ethanol and then dried in a vacuum oven at 130° C. to obtain 3.2 g of a zinc glutarate-supported catalyst.

Example 2

In a 100 ml round-bottom flask, 2.64 g (20 mmol) of glutaric acid and 0.36 g of UiO-66 were added to 50 ml of toluene and dispersed under reflux, and then the mixture was heated at 55° C. for 30 minutes. 1.36 g of ZnO particles were added to the mixed solution and then stirred for 3 hours.

The formed solids were separated using a centrifuge. The separated solids were washed three times with acetone/ethanol and then dried in a vacuum oven at 130° C. to obtain 3.2 g of a zinc glutarate-supported catalyst.

Example 3

In a 100 ml round-bottom flask, 2.64 g (20 mmol) of glutaric acid and 0.72 g of UiO-66 were added to 50 ml of toluene and dispersed under reflux, and then the mixture was heated at 55° C. for 30 minutes. 1.36 g of ZnO particles were added to the mixed solution and then stirred for 3 hours.

The formed solids were separated using a centrifuge. The separated solids were washed three times with acetone/ethanol and then dried in a vacuum oven at 130° C. to obtain 3.2 g of a zinc glutarate-supported catalyst.

Example 4

In a 100 ml round-bottom flask, 2.64 g (20 mmol) of glutaric acid and 0.04 g of UiO-66 were added to 50 ml of toluene and dispersed under reflux, and then the mixture was heated at 55° C. for 30 minutes. 1.36 g of ZnO particles were added to the mixed solution and then stirred for 3 hours.

The formed solids were separated using a centrifuge. The separated solids were washed three times with acetone/ethanol and then dried in a vacuum oven at 130° C. to obtain 3.2 g of a zinc glutarate-supported catalyst.

Example 5

In a 100 ml round-bottom flask, 2.64 g (20 mmol) of glutaric acid and 0.004 g of UiO-66 were added to 50 ml of toluene and dispersed under reflux, and then the mixture was heated at 55° C. for 30 minutes. 1.36 g of ZnO particles were added to the mixed solution and then stirred for 3 hours.

The formed solids were separated using a centrifuge. The separated solids were washed three times with acetone/ethanol and then dried in a vacuum oven at 130° C. to obtain 3.2 g of a zinc glutarate-supported catalyst.

Example 6

In a 100 ml round-bottom flask, 2.64 g (20 mmol) of glutaric acid and 0.36 g of $ZrSO_4$ were added to 50 ml of toluene and dispersed under reflux, and then the mixture was heated at 55° C. for 30 minutes. 1.36 g of ZnO particles were added to the mixed solution and then stirred for 3 hours.

The formed solids were separated using a centrifuge. The separated solids were washed three times with acetone/ethanol and then dried in a vacuum oven at 130° C. to obtain 3.2 g of a zinc glutarate-supported catalyst.

Comparative Example 1

In a 100 ml round-bottom flask, 2.64 g (20 mmol) of glutaric acid was added to 50 ml of toluene and dispersed under reflux, and then the mixture was heated at 55° C. for 30 minutes. 1.36 g of ZnO particles were added to the mixed solution and then stirred for 3 hours.

The formed solids were separated using a centrifuge. The separated solids were washed three times with acetone/ethanol and then dried in a vacuum oven at 130° C. to obtain 3.2 g of a zinc glutarate-supported catalyst.

Comparative Example 2

In a 100 ml round-bottom flask, 2.64 g (20 mmol) of glutaric acid and 0.1 of $MgCl_2$ were added to 50 ml of toluene and dispersed under reflux, and then the mixture was heated at 55° C. for 30 minutes. 1.36 g of ZnO particles were added to the mixed solution and then stirred for 3 hours.

The formed solids were separated using a centrifuge. The separated solids were washed three times with acetone/ethanol and then dried in a vacuum oven at 130° C. to obtain 3.2 g of a zinc glutarate-supported catalyst.

Comparative Example 3

A zinc glutarate-supported catalyst was prepared in the same manner as in Example 1, except that cobalt oxide was used instead of UiO-66.

Test Example 1

Polyethylene carbonates were prepared in the following manner using the catalysts of Examples 1 to 6 and Comparative Examples 1 to 3.

In a glove box, 0.2 g of the catalyst and 8.5 g of dichloromethane were added to an autoclave reactor, and then 8.5 g of ethylene oxide was added thereto. Thereafter, the reactor was pressurized to 30 bar by injecting carbon dioxide. The polymerization reaction was carried out at 70° C. for 3 hours. After the completion of the reaction, unreacted carbon dioxide and ethylene oxide were removed together with dichloromethane used as a solvent. In order to determine the amount of polyethylene carbonate produced, the remaining solids were completely dried and quantified. The activity of the catalyst and the yield according to the polymerization results are shown in Table 1 below.

TABLE 1

| Catalyst | Activity of catalyst (g-polymer/g-catalyst) |
| --- | --- |
| Example 1 | 44 |
| Example 2 | 45 |
| Example 3 | 42 |
| Example 4 | 42 |
| Example 5 | 35 |
| Example 6 | 29 |
| Comparative Example 1 | 21 |
| Comparative Example 2 | 0 |
| Comparative Example 3 | 22 |

Referring to Table 1, it was confirmed that the catalysts of Examples 1 to 6 exhibited excellent catalytic activity as compared with the catalysts of Comparative Examples 1 to 3, and the difference was significant.

Meanwhile, when the ZnO precursor containing Co was used to prepare ZnGA as in Comparative Example 3, the activity of the catalyst was found to be 22 g/gcat, and when ZnO alone was used as in Comparative Example 1, the activity of the catalyst was found to be 21 g/gcat, thereby confirming that the polymerization yield of the polyalkylene carbonates was reduced as compared with the examples of the present invention.

Test Example 2

During the preparation of the organic zinc catalysts, the ratio of the surface element component according to wt % of Zr added per the content of the co-catalyst (UiO-66) with respect to ZnGA was measured. The results are shown in Table 2 (atomic wt %). In addition, the results of a Zr 3 d narrow scan spectrum of each sample are shown in the drawing.

TABLE 2

| Sample (Amount of co-catalyst added) | Zn | O | C | Zr |
|---|---|---|---|---|
| 1  ZnGA (0 wt %) | 13.6 | 37.5 | 48.9 | 0 |
| 2  ZnGA (1 wt %) | 14.9 | 36.8 | 48.1 | 0.2 |
| 3  ZnGA (5 wt %) | 13.7 | 37.5 | 48.3 | 0.5 |
| 4  ZnGA (10 wt %) | 12.8 | 37.6 | 48.7 | 0.7 |

It can be seen from Table 2 and the drawing that the Zr components were well bonded to the surface of the zinc glutarate in the case of the organic zinc catalysts to which Zr was added in a predetermined amount.

In contrast, when the amount of co-catalyst added was too small, the Zr components were not included on the surface of the organic zinc catalysts.

The invention claimed is:

1. A method for preparing an organic zinc catalyst, comprising:
   reacting a zinc precursor with a dicarboxylic acid having 3 to 20 carbon atoms and a zirconium co-catalyst,
   wherein the zirconium co-catalyst is Zr-metal organic framework (MOF) containing zirconium,
   wherein the Zr-metal organic framework is at least one selected from the group consisting of UiO-66 (zirconium 1,4-dicarboxybenzene MOF), UiO-66-NH$_2$, UiO-66-NH$^{3+}$, UiO-67, UiO-68, and Nu-1000.

2. The method for preparing an organic zinc catalyst of claim 1,
   wherein the zirconium co-catalyst is used at a molar ratio of 0.1 mmol to 0.5 mol based on 1 mol of the zinc precursor.

3. The method for preparing an organic zinc catalyst of claim 1,
   wherein the zinc precursor includes at least one compound selected from the group consisting of zinc oxide (ZnO), zinc sulfate (ZnSO$_4$), zinc chlorate (Zn(ClO$_3$)$_2$), zinc nitrate (Zn(NO$_3$)$_2$), zinc acetate (Zn(OAc)$_2$), and zinc hydroxide (Zn(OH)$_2$), and
   wherein the dicarboxylic acid having 3 to 20 carbon atoms includes at least one compound selected from the group consisting of a malonic acid, a glutaric acid, a succinic acid, an adipic acid, a terephthalic acid, an isophthalic acid, a homophthalic acid, and a phenylglutaric acid.

4. The method for preparing an organic zinc catalyst of claim 1,
   wherein the reaction is carried out in the presence of at least one solvent selected from the group consisting of toluene, hexane, dimethylformamide, ethanol, and water.

5. The method for preparing an organic zinc catalyst of claim 1,
   wherein the zirconium co-catalyst is used in an amount of 0.1 to 100 parts by weight based on 100 parts by weight of the zinc precursor.

* * * * *